US006897771B1

(12) United States Patent
Lodhie et al.

(10) Patent No.: US 6,897,771 B1
(45) Date of Patent: May 24, 2005

(54) VEHICLE SIGNAL LIGHT FIXTURE PERFORMING MULTIPLE SIGNALING FUNCTIONS USING AN ARRAY OF LEDS

(75) Inventors: Pervaiz Lodhie, 23105 Kashiwa Ct., Torrance, CA (US) 90505; Steven R. Becerra, San Pedro, CA (US)

(73) Assignee: Pervaiz Lodhie, Rolling Hills, CA (US)

( * ) Notice: Subject to any disclaimer, the term of this patent is extended or adjusted under 35 U.S.C. 154(b) by 0 days.

(21) Appl. No.: 10/622,926

(22) Filed: Jul. 19, 2003

(51) Int. Cl.[7] ................................................ B60Q 1/44
(52) U.S. Cl. ...................... 340/479; 340/464; 340/475; 362/545; 362/800
(58) Field of Search .................. 340/464, 468–490; 362/545, 800

(56) References Cited

U.S. PATENT DOCUMENTS

| D404,506 | S | 1/1999 | Lodhie |
| D405,201 | S | 2/1999 | Lodhie |
| 5,947,588 | A | 9/1999 | Huang |
| D434,510 | S | 11/2000 | Lodhie |
| 6,220,722 | B1 | 4/2001 | Begemann |
| 6,550,949 | B1 * | 4/2003 | Bauer et al. ................. 362/545 |
| 2002/0171543 | A1 * | 11/2002 | Abbe et al. ................. 340/468 |

* cited by examiner

Primary Examiner—Jeffery Hofsass
Assistant Examiner—George Bugg
(74) Attorney, Agent, or Firm—Irving Keschner

(57) ABSTRACT

A signal light fixture for use on a vehicle has a plurality of light-emitting diodes (LEDs) arranged to form an array divided into a first section and a second section, wherein LEDs in the first section emit red light, and wherein LEDs in the second section emit yellow light. A portion of the LEDs in the first section are illuminated to perform a rear tail light function, and all of the LEDs in the first section are illuminated to perform a brake light function. A portion of the LEDs in the second section are illuminated to perform a running light function, and all of the LEDs in the second section are illuminated to perform a turn signal function.

18 Claims, 6 Drawing Sheets

VEHICLE SIGNAL LIGHT FIXTURE PERFORMING MULTIPLE SIGNALING FUNCTIONS USING AN ARRAY OF LEDS

BACKGROUND OF THE INVENTION

1. Field of the Invention

This invention relates generally to vehicle signal lights, and more particularly to vehicle signal lights that perform several different signaling functions.

2. Description of Related Art

Railway (i.e. railroad) transportation is popular the world over. In general, a railway includes one or more parallel series of iron or steel rails spaced apart from on another to form tracks for wheels of railway vehicles. Types of railway vehicles include locomotives, carriages, wagons, rail cars, rail motors, light rail vehicles, rail inspection vehicles, and trolleys. Reported benefits of railway transportation over motor vehicle transportation include reduced fuel consumption, improved air quality, reduced transportation costs, reduced traffic congestion, reduced pavement damage, and improved transportation safety.

As cities grow, motor vehicle traffic volumes in and around the cities typically increase. Growing cities often face the problem of accommodating this increased demand at some point. Light rail is one option that promises to reduce motor vehicle traffic congestion. In general, the term "light rail" is used to describe passenger railway vehicles operating singly or in short (e.g., two car) trains on fixed rails. The rails are typically located near motor vehicle roadways. Light rail vehicles are typically driven electrically with electrical power being drawn from an overhead electric line via a trolley or a pantograph. Light rail vehicles are also often called "streetcars," "tramways," or "trolley cars."

As light rail vehicles typically operate near motor vehicles, they often include electrical signal lights similar to those used on motor vehicles. Such signal lights include brake lights, tail lights, turn signals, and running lights.

A light-emitting diode (LED) is a diode that emits light when a current passes through it. A diode is a semiconductor device through which current can pass in only one direction. LEDs are often used as indicator lights, and are also commonly used in computer system "laser" printers and compact disk read only memory (CD-ROM) drives.

LEDs are in general more efficient, last longer, and are more durable than incandescent light bulbs. LEDs are typically at least 4 times more efficient at generating light than incandescent light bulbs. Unlike incandescent light bulbs, LEDs are extremely shock resistant. While an incandescent light bulb may produce light for 1,000 operating hours, many LEDs can provide 100,000 hours of continuous use. As a result, LEDs are generally preferred over incandescent light bulbs in critical applications.

The specifications for U.S. motor vehicle signal lights are written by the Society of Automotive Engineers (SAE). These specifications are published in SAE publication HS-34 titled SAE Ground Vehicle Lighting Standards Manual, which is updated annually. The SAE standards for passenger car signal lights include:

SAE J585 "Tail Lamps (Rear Position Lamps) For Use on Motor Vehicles Less Than 2032 mm in Overall Width;"

SAE J586 "Stop Lamps for Use on Motor Vehicles Less Than 2032 mm in Overall Width;"

SAE J588 "Turn Signal Lamps for Use on Motor Vehicles Less Than 2032 mm in Overall Width;" and SAE J1957 "Center High Mounted Stop Lamp Standard for Vehicles Less Than 2032 mm in Overall Width."

The additional brake light required by the SAE J1957 standard is commonly referred to as the "third brake light." Many automobile manufacturers are now using LEDs in the third brake light as the fixtures are often inaccessible making lamp replacement extremely difficult.

SUMMARY OF THE INVENTION

The present invention teaches certain benefits in construction and use which give rise to the objectives described below.

The present invention provides a signal light fixture for use on a vehicle. The signal light fixture includes a plurality of light-emitting diodes (LEDs) arranged to form an array divided into a first section and a second section, wherein LEDs in the first section emit red light, and wherein LEDs in the second section emit yellow light. A portion of the LEDs in the first section are illuminated to perform a rear tail light function, and all of the LEDs in the first section are illuminated to perform a brake light function. A portion of the LEDs in the second section are illuminated to perform a running light function, and all of the LEDs in the second section are illuminated to perform a turn signal function.

A primary objective of the present invention is to provide a signal light fixture having advantages not taught by the prior art.

Another objective is to provide a signal light fixture that provides tail light, brake light, running light, and turn signal functions using an array of light-emitting diodes.

A further objective is to provide a signal light fixture that is long lasting, energy efficient, durable, and reliable.

Other features and advantages of the present invention will become apparent from the following more detailed description, taken in conjunction with the accompanying drawings, which illustrate, by way of example, the principles of the invention.

BRIEF DESCRIPTION OF THE DRAWING

The accompanying drawings illustrate the present invention. In such drawings.

DETAILED DESCRIPTION OF THE INVENTION

Figure 1:
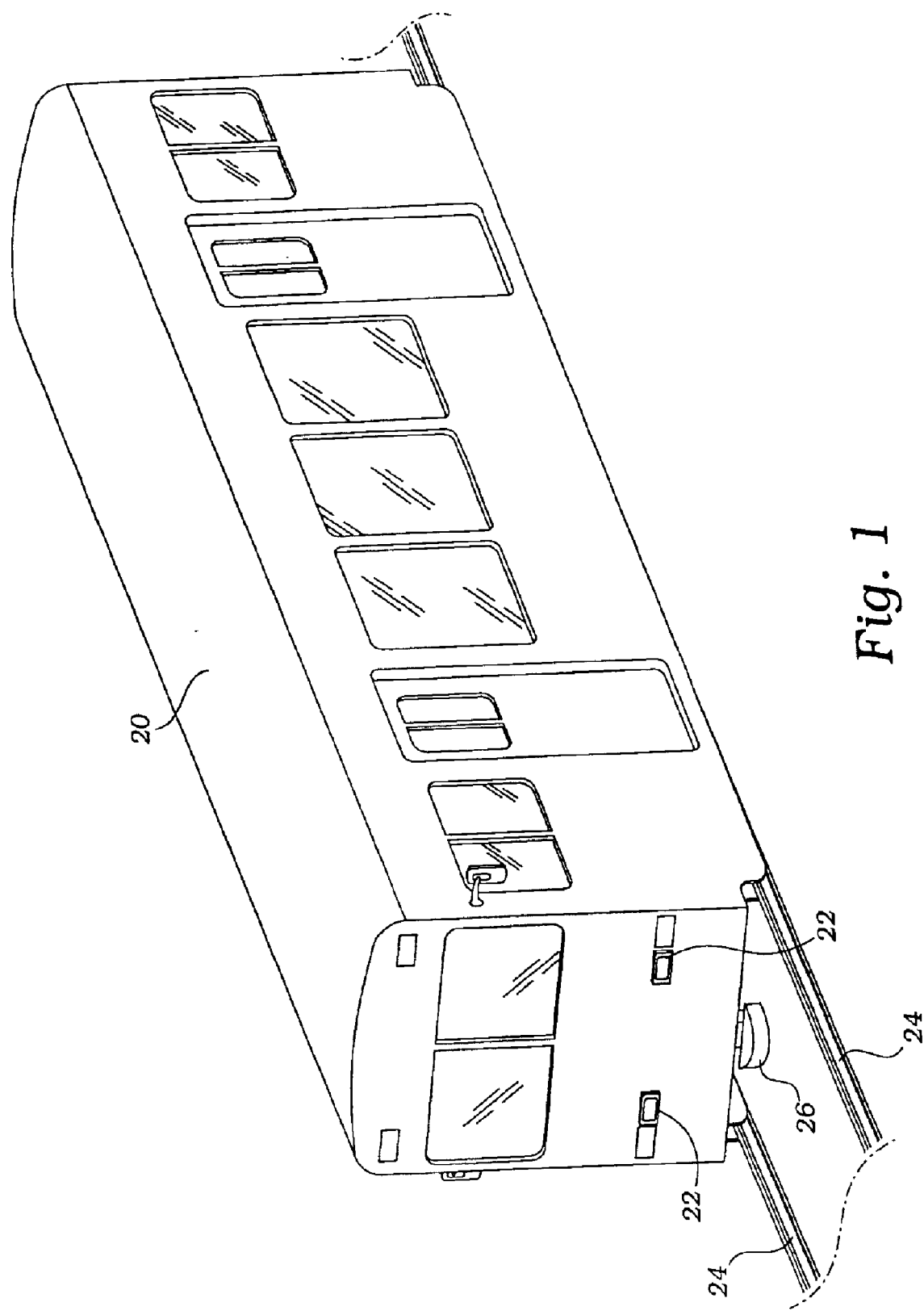
FIG. 1 is a perspective view of a train having a pair of signal light fixtures operably mounted thereupon.

FIG. 1 is a perspective view of a light rail vehicle 20 having a pair of light fixtures 22 mounted on a front end. The rail vehicle 20 has wheels on opposite sides spaced a fixed distance apart. A pair of parallel metal rails 24 are spaced apart from one another to form tracks for the wheels of the rail vehicle 20. The rail vehicle 20 also has a pair of light fixtures similar to light fixtures 22 mounted on a back end.

As is typical, the rail vehicle 20 has a coupler 26 at the front end for coupling to other rail vehicles. The rail vehicle 20 also has a similar coupler at the back end. The rail vehicle 20 may move on the rails 24 by itself, or may be coupled to one or more other rail vehicles and move on the rails 24 along with the other rail vehicles.

Figure 2:
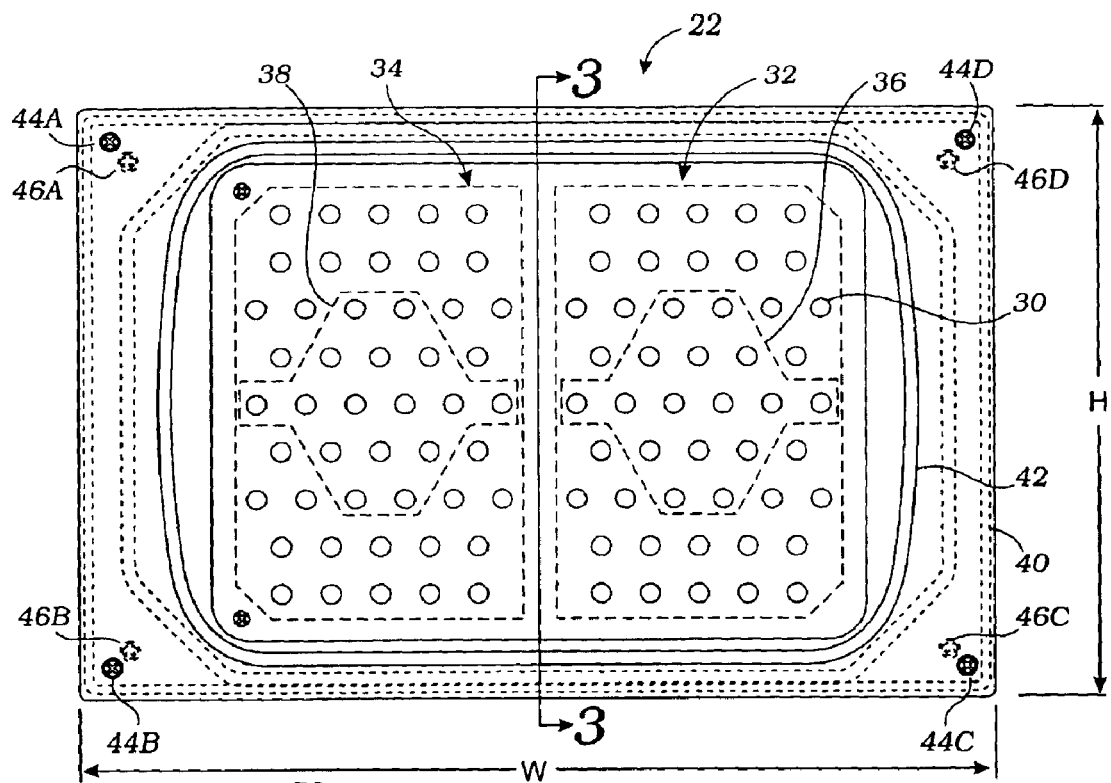
FIG. 2 is a top plan view of the signal light fixture.

FIG. 2 is a top plan view of one embodiment of a representative one of the light fixtures 22 of FIG. 1. In the embodiment of FIG. 2 the light fixture 22 includes multiple light-emitting diodes (LEDs) 30 arranged to form an array. The LEDs 30 are mounted to a printed circuit board (PCB). A right portion 32 of the array includes LEDs that emit red light (i.e., red LEDs) and a left portion 34 of the array includes LEDs that emit yellow light (i.e., yellow LEDs).

The red LEDs in a central portion 36 of the right portion 32 are illuminated to perform a rear tail light function. The rear tail light function preferably meets or exceeds the requirements in SAE standard J585 "Tail Lamps (Rear Position Lamps) For Use on Motor Vehicles Less Than 2032 mm in Overall Width." All of the red LEDs in the right portion 32 are illuminated to perform a brake light function. The brake light function preferably meets or exceeds the requirements in SAE standard J586 "Stop Lamps for Use on Motor Vehicles Less Than 2032 mm in Overall Width."

The yellow LEDs in the central portion 38 of the left portion 34 are illuminated to perform a running light function. The running light function preferably meets or exceeds the requirements in SAE standard J585 "Tail Lamps (Rear Position Lamps) For Use on Motor Vehicles Less Than 2032 mm in Overall Width." All of the yellow LEDs in the left portion 34 are illuminated to perform a turn signal function. The turn signal function preferably meets or exceeds the requirements in SAE standard J588 "Turn Signal Lamps for Use on Motor Vehicles Less Than 2032 mm in Overall Width."

Referring back to FIG. 1, when the front end of the rail car 20 is facing in a primary direction of travel, the light fixtures 22 at the front end of the rail car 20 expectedly perform the running light and turn signal functions, and the pair of light fixtures similar to light fixtures 22 mounted on the back end expectedly perform the rear tail light, brake light, and turn signal functions.

On the other hand, the rail car 20 may be oriented such that the back end is facing in the primary direction of travel (e.g., when the rail car 20 is coupled behind, and being towed by, another rail vehicle). In this situation, the pair of light fixtures mounted on the back end expectedly perform the running light and turn signal functions, and the light fixtures 22 at the front end of the rail car 20 expectedly perform the rear tail light, brake light, and turn signal functions.

Referring back to FIG. 2, the red LEDs in the right portion 32 of the array in general emit light having wavelengths between about 620 nanometers and approximately 680 nanometers. In one embodiment, the red LEDs in the right portion 32 emit light having wavelengths of about 633 nanometers.

In general, the yellow LEDs in the left portion 34 of the array emit light having wavelengths between about 540 nanometers and approximately 600 nanometers. In one embodiment, the yellow LEDs in the left portion 34 emit light having wavelengths of about 595 nanometers.

The light fixture 22 also includes a frame 40, a lens 42, and four screws 44A–44D for attaching the lens 42 to the base plate 40. The frame 40 forms a frame for the light fixture 22, and is preferably made of a metal (e.g., stainless steel). The lens 42 is substantially transparent to visible light having wavelengths between about 540 nanometers and approximately 680 nanometers, and prevents components of the light fixture 22 from foreign objects and liquids (e.g., water). Light emitted by the LEDs 30 substantially passes through the lens 42. The lens 42 is preferably made from a plastic material. Suitable plastic materials include acrylic plastic resins such as Plexiglas® (Atofina Chemicals, Inc., Philadelphia, Pa.) and polycarbonate resins such as Lexan® (General Electric Company, Schenectady, N.Y.).

The four screws 44A–44D for attaching the lens 42 to the base plate 40 are preferably made of stainless steel. Also illustrated in FIG. 2 are four screws 46A–46D for attaching the base plate 40 to the rail vehicle 20 of FIG. 1. The four screws 46A–46D are also preferably made of stainless steel.

In FIG. 2 the light fixture 22 has a width "W" and a height "H." In one embodiment, the width W of the light fixture 22 is 10.00 inches (in.) and the height H is 6.56 in.

Figure 3:
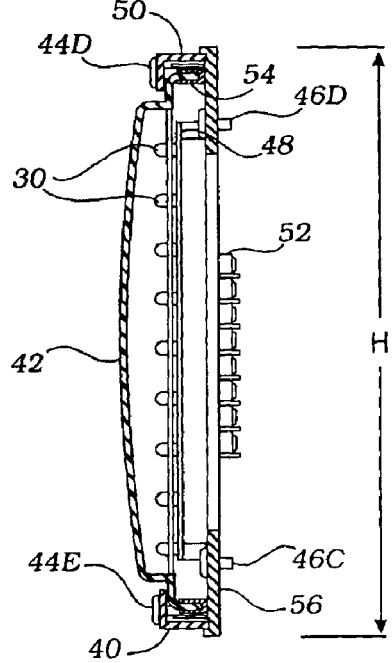
FIG. 3 is a sectional view thereof taken along line 3—3 in FIG. 2.

FIG. 3 is sectional view of the light fixture 22 of FIG. 2 as indicated in FIG. 2. Evident in FIG. 3 are additional components of the light fixture 22 including a printed circuit board (PCB) 48 to which the LEDs 30 of the light fixture 22 are mounted, a base plate 50, a terminal block 52, a first gasket 54, and a second gasket 56. The PCB 48 is mounted to the base plate 54. The base plate 54 is preferably made of a metal (e.g., aluminum). The terminal block 52 includes several screw-type terminals for connecting wires to the light fixture 22, and is mounted to a side of the base plate 54 opposite the PCB 48. The first gasket 54 is a "U"-channel gasket positioned between an edge of the lens 42 and the base plate 54 as shown in FIG. 3. When the light fixture 22 is mounted on the rail vehicle 20 of FIG. 1, the second gasket 56 is positioned between the light fixture 22 and the rail vehicle 20.

Figures 4, 5:
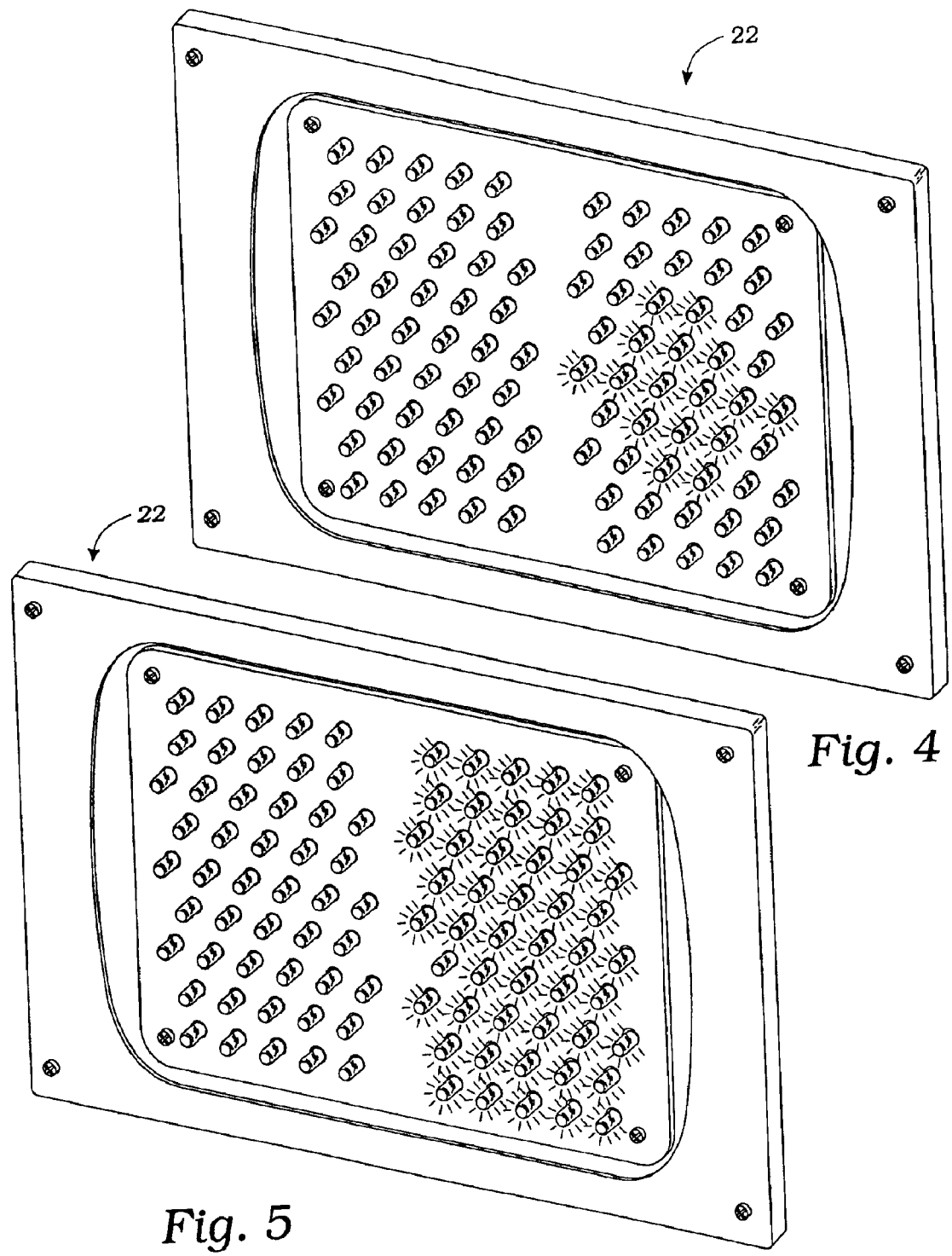
FIG. 4 is a perspective view of the signal light fixture illustrating how the signal light fixture is illuminated in tail light mode.
FIG. 5 is a perspective view thereof illustrating how the signal light fixture is illuminated in brake light mode.

FIG. 4 is a perspective view of the light fixture 22 of FIG. 2 wherein the red LEDs in the central portion 36 of the right portion 32 are illuminated to perform the rear tail light function. As described above, the rear tail light function preferably meets or exceeds the requirements in SAE standard J585 "Tail Lamps (Rear Position Lamps) For Use on Motor Vehicles Less Than 2032 mm in Overall Width."

FIG. 5 is a perspective view of the light fixture 22 of FIG. 2 wherein all of the LEDs in the right portion 32 are illuminated to perform the brake light function. As described above, the brake light function preferably meets or exceeds the requirements in SAE standard J586 "Stop Lamps for Use on Motor Vehicles Less Than 2032 mm in Overall Width."

Figures 6, 7:
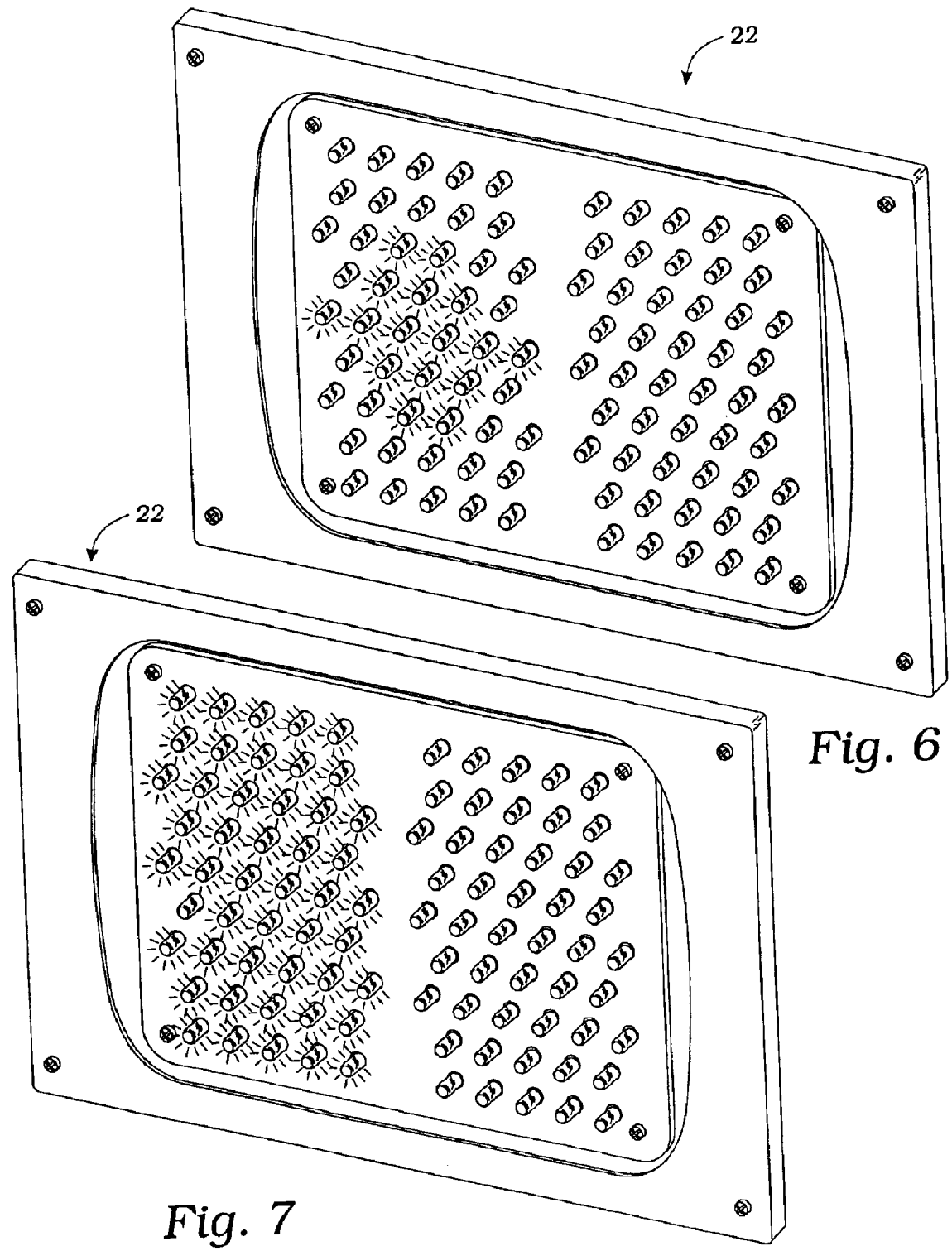
FIG. 6 is a perspective view thereof illustrating how the signal light fixture is illuminated in running light mode.
FIG. 7 is a perspective view thereof illustrating how the signal light fixture is illuminated in turn signal mode.

FIG. 6 is a perspective view of the light fixture 22 of FIG. 2 wherein the yellow LEDs in the central portion 38 of the left portion 34 are illuminated to perform the running light function. As described above, the running light function preferably meets or exceeds the requirements in SAE standard J585 "Tail Lamps (Rear Position Lamps) For Use on Motor Vehicles Less Than 2032 mm in Overall Width."

FIG. 7 is a perspective view of the light fixture 22 of FIG. 2 wherein all of the LEDs in the left portion 34 are illuminated to perform the turn signal function. As described above, the turn signal function preferably meets or exceeds the requirements in SAE standard J588 "Turn Signal Lamps for Use on Motor Vehicles Less Than 2032 mm in Overall Width."

Figure 8:
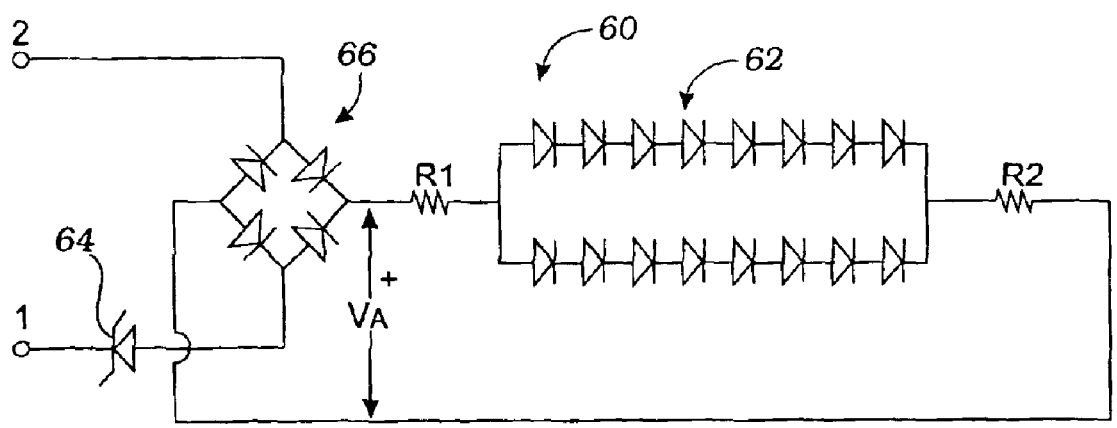
FIG. 8 is a diagram of one embodiment of a circuit for illuminating LEDs of a central portion of one side of the signal light fixture.

FIG. 8 is a diagram of one embodiment of a circuit 60 for illuminating LEDs 62 of the central portions 36 and 38 of the respective right and left portions 32 and 34 of the array of LEDs of the light fixture 22 of FIG. 2. In the embodiment of FIG. 8, the circuit 60 includes two terminals labeled "1" and "2" in FIG. 8, a zener diode 64, a diode array 66, two resistors R1 and R2, and the LEDs 62. The zener diode 64 and the diode array 66 allow two different direct current (dc) voltages to properly illuminate the LEDs 62.

In the embodiment of FIG. 8, the LEDs 62 are arranged to form 2 separate circuits in parallel each including the same number of LEDs connected in series. In one embodiment, the central portions 36 and 38 of the respective right and left portions 32 and 34 of the array of LEDs of the light fixture 22 of FIG. 2 each include 16 LEDs, and each of the 2 separate parallel circuits of the LEDs 62 includes 8 LEDs connected in series.

In FIG. 8, the resistors R1 and R2 and the LEDs 62 have a voltage "$V_A$" across them. A dc current through the LEDs 62 depends on the voltage $V_A$, the forward voltage drop of the LEDs 62, and the values of the resistors R1 and R2. Knowing the voltage $V_A$ and the forward voltage drop of the LEDs 62, the resistors R1 and R2 are valued to allow a desired dc current to flow through the LEDs 62.

The diode array 66 includes 4 diodes arranged to form the familiar bridge rectifier circuit used to achieve full-wave rectification of alternating current (ac) waveforms.

When a positive dc voltage is applied to terminal 1 and a negative (i.e., ground) dc voltage is applied to terminal 2 such that the dc voltage between the terminals 1 and 2 is V1, the zener diode 64 is reverse biased and has a zener voltage drop "$V_Z$" across it. Where the forward biased diodes of the diode array 66 have a diode voltage drop "$V_D$" across them, the voltage $V_A$ shown in FIG. 8 is approximately V1−Vz−2$V_D$.

When a positive dc voltage is applied to terminal 2 and a negative (i.e., ground) dc voltage is applied to terminal 1 such that the dc voltage between the terminals 1 and 2 is V2, the zener diode 64 is forward biased and has the diode voltage drop $V_D$ across it. In this situation, the voltage $V_A$ shown in FIG. 8 is approximately V2−3$V_D$.

When $V2=V1-V_Z+V_D$, voltage $V_A$ is a constant. For example, assume the circuit 60 is configured to properly illuminate the LEDs 62 when V1=36 volts dc (vdc), $V_Z$=9 vdc, and $V_D$=1 vdc. In this situation voltage $V_A$=25 vdc. When a positive dc voltage is applied to terminal 2 and a negative (i.e., ground) dc voltage is applied to terminal 1 such that the dc voltage between the terminals 1 and 2 is 28 vdc, $V_A$ is also equal to 25 vdc. Thus the circuit 60 properly illuminates the LEDs 62 when: (i) a positive dc voltage is applied to terminal 1 and a negative (i.e., ground) dc voltage is applied to terminal 2 such that the dc voltage between the terminals 1 and 2 is 36 vdc, and (ii) a positive dc voltage is applied to terminal 2 and a negative (i.e., ground) dc voltage is applied to terminal 1 such that the dc voltage between the terminals 1 and 2 is 28 vdc.

In one embodiment, the circuit 60 is configured to allow the light fixture 22 of FIG. 2 to operate at 36 vdc and 28 vdc.

Figure 9:
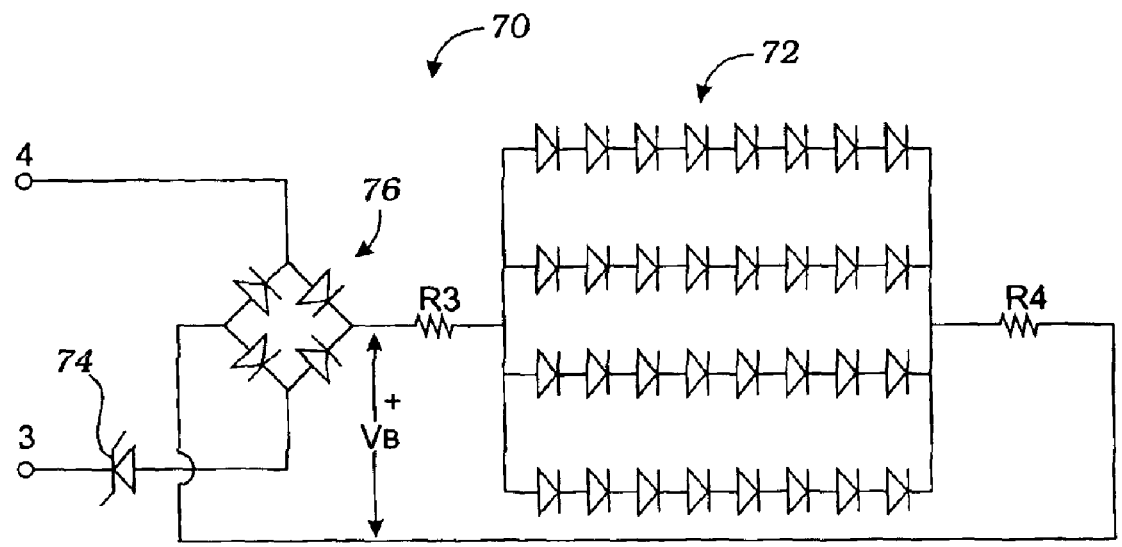
FIG. 9 is a diagram of one embodiment of a circuit for illuminating LEDs not in the central portion of one side of the signal light fixture.

FIG. 9 is a diagram of one embodiment of a circuit 70 for illuminating LEDs 72 not in the central portions 36 and 38 of the respective right and left portions 32 and 34 of the array of LEDs of the light fixture 22 of FIG. 2. In the embodiment of FIG. 9, the circuit 70 includes two terminals labeled "3" and "4" in FIG. 9, a zener diode 74, a diode array 76, two resistors R3 and R4, and the LEDs 72. The zener diode 74 and the diode array 76 allow two different direct current (dc) voltages to properly illuminate the LEDs 72.

In the embodiment of FIG. 9, the LEDs 72 are arranged to form 4 separate circuits in parallel each including the same number of LEDs connected in series. In one embodiment, the right and left portions 32 and 34 of the array of LEDs of the light fixture 22 of FIG. 2 each include 32 LEDs not in the respective central portions 36 and 38, and each of the 4 separate parallel circuits of the LEDs 72 includes 8 LEDs connected in series.

In FIG. 9, the resistors R3 and R4 and the LEDs 72 have a voltage "$V_B$" across them. A dc current through the LEDs 72 depends on the voltage $V_B$, the forward voltage drop of the LEDs 72, and the values of the resistors R3 and R4. Knowing the voltage $V_B$ and the forward voltage drop of the LEDs 72, the resistors R3 and R4 are valued to allow a desired dc current to flow through the LEDs 72.

The circuit 70 is configured to properly illuminate the LEDs 72 when: (i) a positive dc voltage is applied to terminal 3 and a negative (i.e., ground) dc voltage is applied to terminal 4 such that the dc voltage between the terminals 3 and 4 is V1, and (ii) a positive dc voltage is applied to terminal 4 and a negative (i.e., ground) dc voltage is applied to terminal 3 such that the dc voltage between the terminals 3 and 4 is V2, where $V2=V1-V_Z+V_D$.

Figure 10:
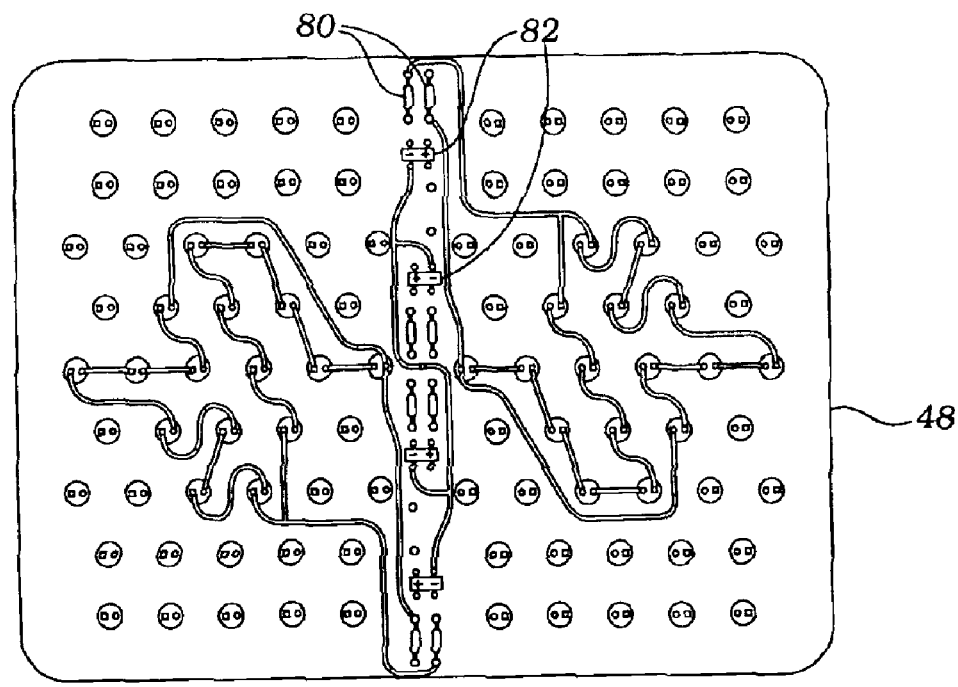
FIG. 10 is a bottom plan view of a component side of a PCB wherein the circuit of FIG. 8 is realized.

FIG. 10 is a diagram of a component side of the PCB 48 of FIG. 3 wherein the circuit 60 of FIG. 8 is realized. In FIG. 10, resistors are labeled 80 and diode arrays are labeled 82.

Figure 11:
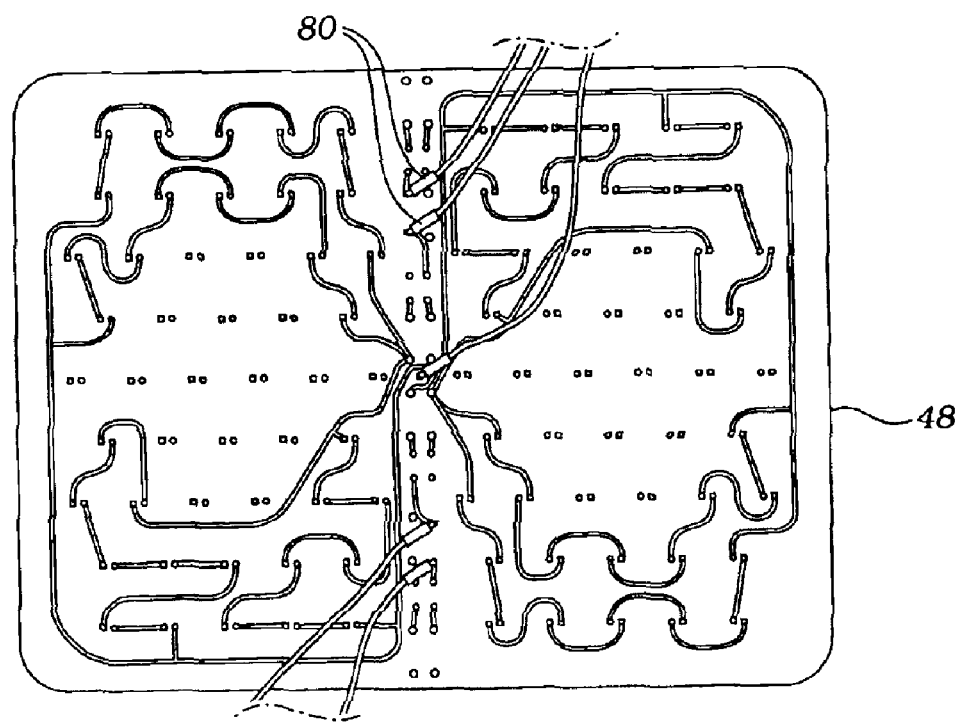
FIG. 11 is a bottom plan view of the component side of the PCB wherein the circuit of FIG. 9 is realized.

FIG. 11 is a diagram of a solder side of the PCB 48 of FIG. 3 wherein the circuit 70 of FIG. 9 is realized. In FIG. 11, zener diodes are labeled 90.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A signal light fixture for use on a vehicle, comprising:
   a plurality of light-emitting diodes (LEDs) arranged to form an array divided into a first section and a second section, wherein LEDs in the first section emit red light, and wherein LEDs in the second section emit yellow light;
   wherein a portion of the LEDs in the first section are illuminated to perform a rear tail light function;
   wherein all of the LEDs in the first section are illuminated to perform a brake light function;
   wherein a portion of the LEDs in the second section are illuminated to perform a running light function; and
   wherein all of the LEDs in the second section are illuminated to perform a turn signal function.

2. The signal light fixture as recited in claim 1, wherein the array has two sides, and wherein the first section is on one side of the array, and wherein the second section is on the other side of the array.

3. The signal light fixture as recited in claim 2, wherein the array has a right side and a left side, and wherein the first section is on the right side of the array, and wherein the second section is on the left side of the array.

4. The signal light fixture as recited in claim 1, wherein one third of the LEDs in the first section are illuminated to perform the rear tail light function.

5. The signal light fixture as recited in claim 1, wherein one third of the LEDs in the second section are illuminated to perform the running light function.

6. The signal light fixture as recited in claim 1, wherein the portion of the LEDs in the first section illuminated to perform the rear tail light function are located in a central portion of the first section.

7. The signal light fixture as recited in claim 1, wherein the portion of the LEDs in the second section illuminated to perform the running light function are located in a central portion of the second section.

8. The signal light fixture as recited in claim 1, wherein the LEDs in the first section emit light having wavelengths between about 620 nanometers and approximately 680 nanometers.

9. The signal light fixture as recited in claim 1, wherein the LEDs in the first section emit light having wavelengths of about 633 nanometers.

10. The signal light fixture as recited in claim 1, wherein the LEDs in the second section emit light having wavelengths between about 540 nanometers and approximately 600 nanometers.

11. The signal light fixture as recited in claim 1, wherein the LEDs in the second section emit light having wavelengths of about 595 nanometers.

12. The signal light fixture as recited in claim 1, further comprising a lens substantially transparent to visible light having wavelengths between about 540 nanometers and approximately 680 nanometers.

13. The signal light fixture as recited in claim 1, wherein all the LEDs of the signal light fixture are mounted on a single printed circuit board.

14. The signal light fixture as recited in claim 1, wherein the signal light fixture is configured to operate at two different electrical voltages.

15. The signal light fixture as recited in claim 14, wherein the signal light fixture is configured to operate at 36 volts direct current and 28 volts direct current.

16. The signal light fixture as recited in claim 1, further comprising a circuit for illuminating the portion of the LEDs in the first section, wherein the circuit comprises:
   a pair of terminals;
   a zener diode and a diode array coupled between the pair of terminals and configured to produce an electrical voltage for illuminating the portion of the LEDs in the first section;
   wherein two different electrical voltages applied between the pair of terminals cause the zener diode and the diode array to produce substantially the same electrical voltage for illuminating the portion of the LEDs in the first section.

17. The signal light fixture as recited in claim 16, wherein one of the two different electrical voltages applied between the pair of terminals reverse biases the zener diode and causes a zener voltage to be developed across the zener diode.

18. The signal light fixture as recited in claim 17, wherein the other electrical voltage applied between the pair of terminals forward biases the zener diode and causes a diode voltage to be developed across the zener diode, wherein the diode voltage is less than the zener voltage.

* * * * *